United States Patent [19]

Epworth et al.

[11] Patent Number: 4,898,443

[45] Date of Patent: Feb. 6, 1990

[54] COHERENT MIXING OF OPTICAL SIGNALS

[75] Inventors: Richard E. Epworth, Bishop's Stortford; Stephen Wright, London; Terry Bricheno, Great Sampford, all of England

[73] Assignee: STC PLC, London, England

[21] Appl. No.: 289,396

[22] Filed: Dec. 19, 1988

Related U.S. Application Data

[63] Continuation of Ser. No. 69,115, Jul. 2, 1987, abandoned.

[30] Foreign Application Priority Data

Aug. 5, 1986 [GB] United Kingdom ............... 8619080

[51] Int. Cl.⁴ ........................... G02B 6/26; G02B 6/42
[52] U.S. Cl. ................................................ 350/96.15
[58] Field of Search ........................... 350/96.15, 96.16

[56] References Cited

PUBLICATIONS

Sorin et al.; "Highly Selective Evanescent Model Filter for Two-Mode Optical Fibers"; *Optics Letters*; vol. 11, No. 9; Sep. 1986.

*Primary Examiner*—William L. Sikes
*Assistant Examiner*—Robert E. Wise
*Attorney, Agent, or Firm*—Lee, Mann, Smith, McWilliams & Sweeney

[57] ABSTRACT

A non-circularly-symmetric intensity distribution is formed on a quadrant photodetector by coherently mixing two optical signals propagating in selected modes of different order. These modes are chosen either such that a change in relative phase of the two signals produces solely a rotation of the orientation of that intensity distribution, or such that a change in relative states of polarization produces this rotation.

17 Claims, 7 Drawing Sheets

COHERENT MIXING OF OPTICAL SIGNALS

This application is a continuation, of application Ser. No. 069,115, filed July 2, 1987, now abandoned.

BACKGROUND OF THE INVENTION

This invention relates to coherent mixing of optical signals. Coherent mixing for detection finds applications not only in certain forms of information transmission systems, but also in certain forms of sensor systems. One of the problems of a coherent system is that detection efficiency falls to zero if ever the two signals being mixed are allowed to come into phase quadrature or their polarisation states are allowed to become orthogonal. In some coherent systems phase may present no particular problem, while in others polarisation may be no problem. Thus phase is no problem in a heterodyne system because the relative phase is continually changing, executing complete cycles at the beat frequency. Similarly polarisation is no problem in a system where states of polarisation are well defined throughout the system, for instance by the use of polarisation maintaining optical fibre. Where, however, phase or polarisation is a potential problem, a solution to that problem may be found by the use of diversity techniques.

One way of providing phase diversity is to make use of a 3=3 fibre coupler as described in a paper by A. W. Davis and S. Wright entitled "A phase insensitive homodyne optical receiver" given at the IEE Colloquium on Advances in Coherent Optical Devices and Technologies, 26 March, 1985, and in Specification No. GB 2 172 766A. It would be preferable to have outputs in phase quadrature instead of 120° apart in phase, and a network providing this, which employs four 2=2 couplers, has been described by D. W. Stowe and T. Y. Hsu in a paper entitled "Demodulation of Interferometric Sensors Using a Fiber-Optic Passive Quadrature Demodulator" IEEE/OSA Journal of Lightwave Technology LT-1, No. 3 pp. 519–523 (Sept. 1983). In this network the four couplers are connected in two pairs, with the outputs of the first pair feeding the inputs to the second pair. A drawback of this approach is that a specific phase relationship is required for the inputs to the second pair of couplers for the network to function properly, and this means that the stability and relative optical path length of the connections between the first and second pairs of couplers must be maintained with great precision.

SUMMARY OF THE INVENTION

The present invention, in its application to providing phase diversity discloses an alternative approach, and in particular provides a solution to the phase diversity problem that avoids the requirement for strict phase relationships to be maintained between different optical paths. This solution involves interfering two optical signals in a manner to provide an intensity distribution that is not circularly symmetric and has the property that a change of relative phase produces solely a change in the orientation of that intensity distribution. This may be achieved for instance by interfering a zero order mode signal with a first order mode signal having the same polarisation as that of the zero order mode signal. For instance, a circularly polarised zero order mode interfered with a circularly polarised first order mode will produce the desired intensity distribution. The circularly polarised zero order mode can be provided by superimposing the two orthorgonally polarised $HE_{11}$ modes in phase quadrature, while the circularly polarised first order mode can similarly be provided by superimposing the first order $TE_{01}$ and $TM_{01}$ modes in phase quadrature.

An equivalent intensity distribution results from interfering a single linearly polarised zero order $HE_{11}$ mode with the radially polarised first order $TM_{01}$ or $TE_{01}$ mode, but in this instance the orientation of that intensity distribution shows a dependency upon the orientation of the plane of polarisation of the $HE_{11}$ mode.

According to the present invention there is provided a method of optical signals processing in which first and second optical signals of different mode order are coherently mixed to produce a spatial intensity distribution that is not circularly symmetric, wherein the modes of the two signals being mixed are chosen, either such that a change in relative phase produces solely a change in orientation of that intensity distribution, or such that a change in their relative states of polarisation produces solely a change in the orientation of that intensity distribution.

The invention also resides in an optical system including a multi-element detector and an optical signal mixing element for coherently mixing first and second optical input signals for detection at said detector, wherein the mixing element is constructed to mix said first and second input signals for incidence upon the detector respectively in a form providing a zero order optical field distribution and in the form of a first order field distribution.

BRIEF DESCRIPTION OF THE DRAWINGS

There follows a description of optical systems embodying the invention in preferred forms. This description is accompanied by a description of the principles underlying their operation. The description refers to the accompanying drawings, in which.

DETAILED DESCRIPTION OF PREFERRED EMBODIMENTS

Figure 1A:
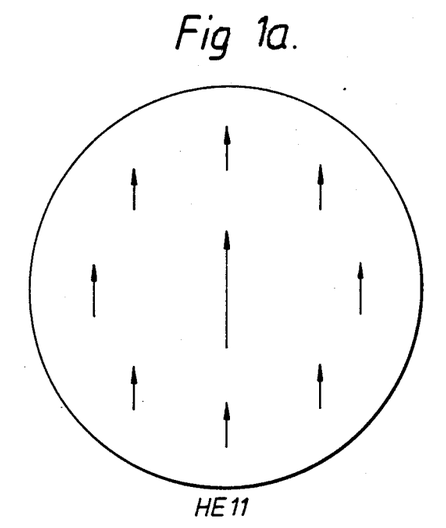
FIGS. 1a and 1b diagrammatically depict the optical field distribution of the horizontal and vertical linearly polarised $HE_{11}$ zero order modes.
Figure 1B:
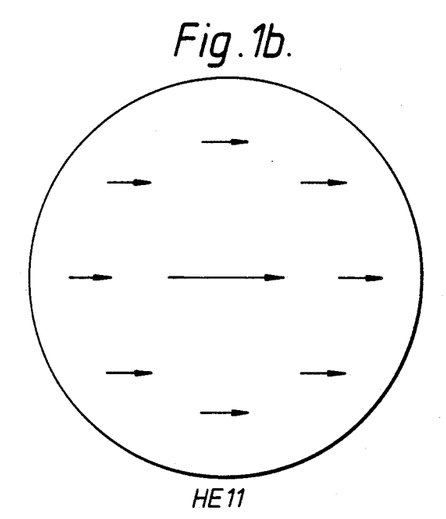
Figure 2A:
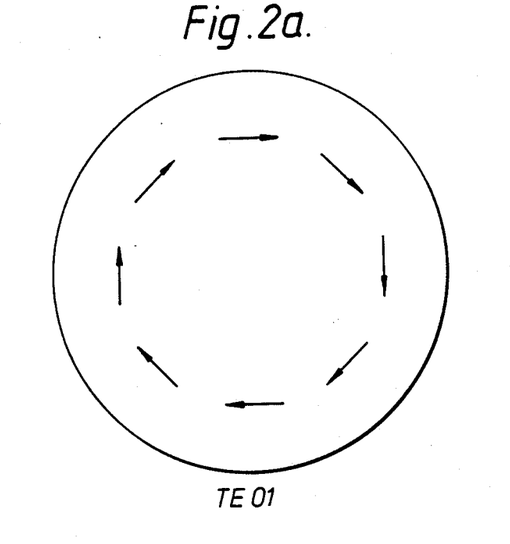
FIGS. 2a and 2b similarly depict the optical field distribution of the $TE_{01}$ and $TM_{01}$ first order modes.
Figure 2B:
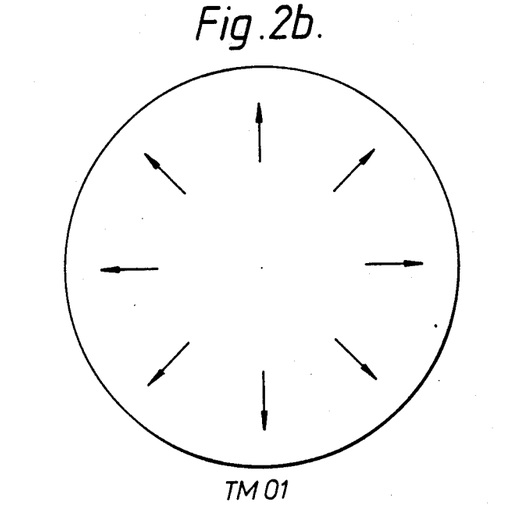

In a weakly guiding fibre the fundamental mode, also referred to as the zero order mode, actually consists of two orthogonally polarised modes, both $HE_{11}$. These are depicted in FIGS. 1a and 1b. The direction of the arrows in these Figures respectively indicate vertical polarisation for FIG. 1a and horizontal polarisation for FIG. 1b. The arrow at the centre of each of these two figures is larger than those disposed around it to indicate that the field is greatest at the centre. In a low birefringence circularly symmetric fibre these two modes propagate with equal velocity, and so may be combined to produce any arbitrary pair of orthogonally polarised modes, such as left- and right-handed circularly polarised modes, or two orthogonal elliptically polarised modes. There are four true first order modes, namely $TE_{01}$, $TM_{01}$ and odd and even $HE_{21}$. The pair of $HE_{21}$ modes are degenerate in the same way as the pair of $HE_{11}$ modes, but the three different types of first order mode $TE_{01}$, $TM_{01}$ and $HE_{21}$ generally propagate with slightly differing velocities. The $TE_{01}$ and $TM_{01}$ modes both have annular circularly symmetric field distribution, which are respectively tangential and radial, and are depicted in FIGS. 2a and 2b.

Figure 3:
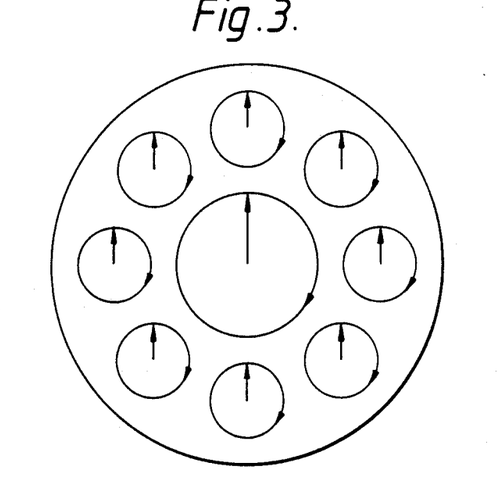
FIGS. 3 and 4 depict the circularly polarised optical field distribution produced by forming hybrids respectively of the $HE_{11}$ modes of FIG. 1 and the $TE_{01}$ and $TM_{01}$ modes of FIG. 2.

A circularly polarised $HE_{11}$ field may be excited by superimposing the two orthogonally polarised linear $HE_{11}$ modes in phase quadrature. The resultant is a field vector rotating at the optical frequency in a clockwise or anti-clockwise direction according to whether the phase of the second mode leads or lags the first. This circularly polarised $HE_{11}$ field is depicted in FIG. 3. The straight arrows indicate the field direction at a particular instant in time. It will be noticed that all the straight arrows are parallel, indicating that the field direction is the same over the whole area of the mode. The circular arrows indicate a clockwise progression of the field direction.

Figure 4:
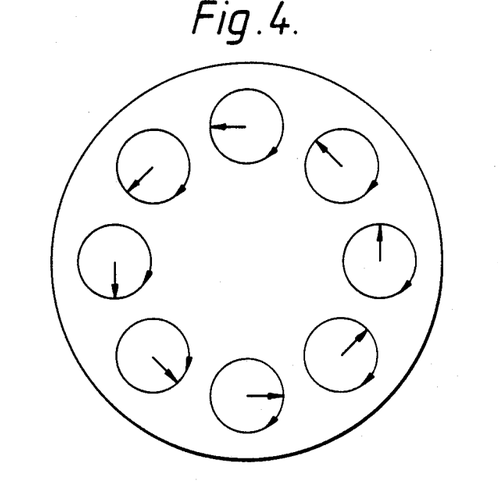

Similarly, a circularly polarised, circularly symmetric, first order field distribution is obtained by superimposing the $TE_{01}$ and $TM_{01}$ modes in phase quadrature. This produces an annular field distribution as depicted in FIG. 4. In this instance the instantaneous field direction is not the same all round the annulus, but is at progressively different directions around the annulus so that at any instant any given field direction occurs just once around the annulus. The polarisation of FIG. 4 is the same as that of FIG. 3, since both are clockwise (right-handed) circular.

The field distributions of FIGS. 3 and 4 have been referred to as fields rather than as modes because they are not pure modes, but are hybrids constructed from modes that do not necessarily have identical propagation constants. The effect of a difference in propagation constant of the two pure modes of a hybrid means that only at every half beat length will they beat together in a manner to produce an exactly circularly polarised state. However, when operating near first order mode cut-off the propagation constants for $TE_{01}$ and $TM_{01}$ become almost identical, and so the beat length becomes very long, with the result that substantially circular polarisation is preserved over many centimetres. It will be evident however, that it is not necessary in the context of the present invention to work under conditions where the propagation constants are closely matched provided that the geometry is arranged to produce the requisite phase quadrature relationship at the detector.

Examination of FIGS. 3 and 4 reveals that, though both fields show circular symmetry, if one field is superimposed upon the other the resultant does not possess circular symmetry because at one point in the annulus, the fields are in opposition, whereas at the diametrically opposite position they reinforce one another. Thus, if the fields are superimposed with the phase relationship as depicted in FIGS. 3 and 4 the fields are in opposition on the left-hand side of the annulus but reinforce each other on the right-hand side. The centre of gravity of the intensity profile is therefore shifted to the right of centre. The effect of changing the relative phases of the two superimposed fields is to change the orientation of this shift in the centre of gravity without changing its magnitude. Thus, if the phase of the zero order field were delayed by 90° with respect to that of the first order field, then the fields would be in opposition at the bottom of the annulus and reinforcing each other at the top. Under these circumstances, the shift in the centre of gravity is upwards from centre. The resultant intensity distribution produced by the superimposing of these two fields has the general shape depicted in FIG. 5 with the azimuth of the peak 50 being determined by the relative phases of the superimposed fields.

Figure 5:
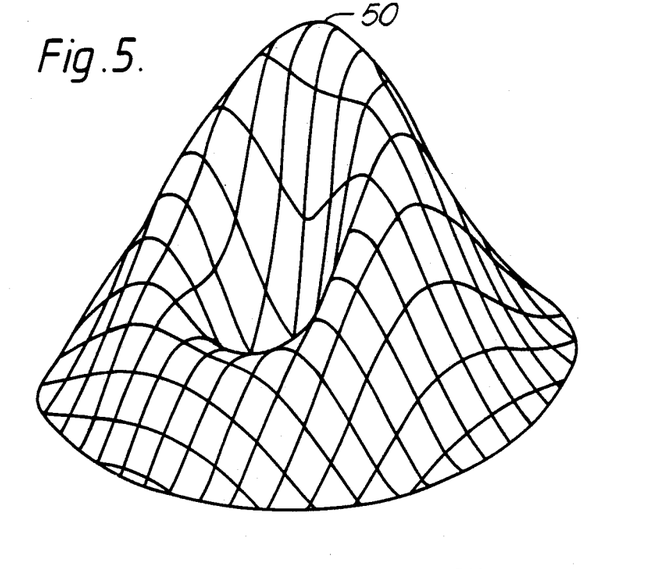
FIG. 5 is a plot of the resultant intensity distribution produced by superimposing the fields of FIGS. 3 and 4.
Figure 6A:
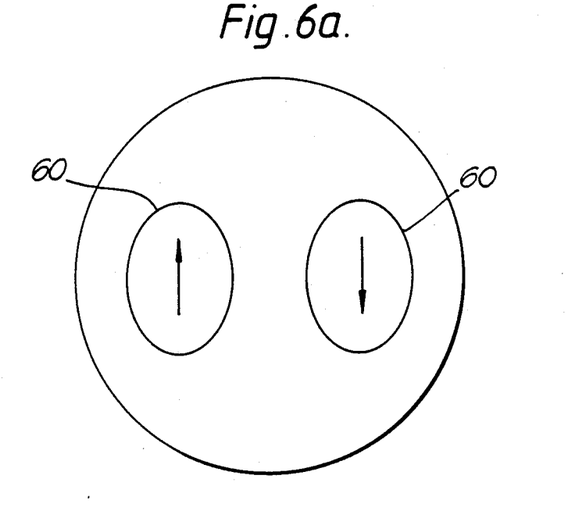
FIGS. 6a and 6b diagrammatically depict the optical field distributions of the complementary linearly polarised hybrid modes $LP_{11}$.
Figure 6B:
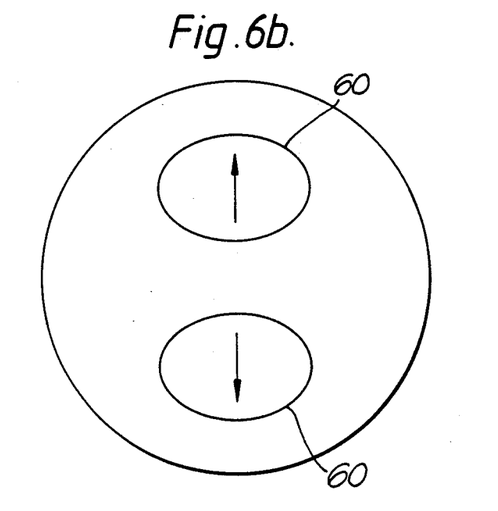
Figure 7A:
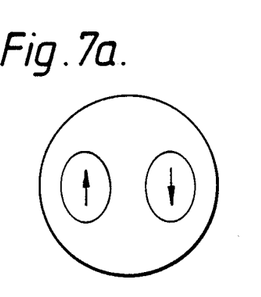
FIGS. 7a to 7d depict the precession resulting from superimposing the complementary $LP_{11}$ modes in phase quadrature.
Figure 7B:
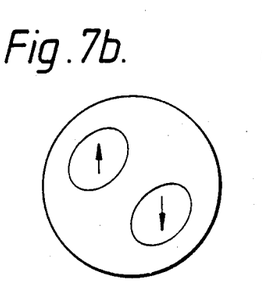
Figure 7C:
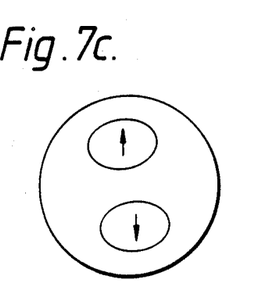
Figure 7D:
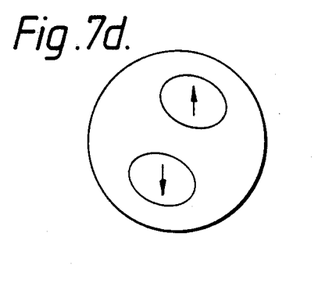
Figure 8:
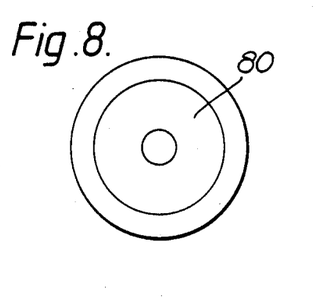
FIG. 8 depicts the time-averaged resultant of the superimposed $LP_{11}$ modes.

The resultant intensity distribution of FIG. 5 results from a superimposing of zero order and first order fields of similar circular polarisation. Another way in which it may be provided is by the superimposing of zero order and first order fields of linear polarisation. In this instance the zero order field is that of one of the $LP_{01}$ modes which are virtually identical with the $HE_{11}$ modes, while the first order field is produced by superimposing similarly oriented complementary linearly polarised hybrid modes $LP_{11}$ in phase quadrature. FIGS. 6a and 6b depict the two complementary hybrid $LP_{11}$ modes. The intensity distribution of both of these first order hybrid modes consists of two spots 60 in which the electric field is oppositely directed at any instant along a single axis which remains fixed. When these hybrid modes are superimposed in phase quadrature the spots 60 precess at the optical frequency, but the field axis remains fixed. FIGS. 7a, 7b, 7c and 7d illustrate this precession. The time averaged intensity distribution result is an annulus 80 as depicted in FIG. 8.

Figure 9:
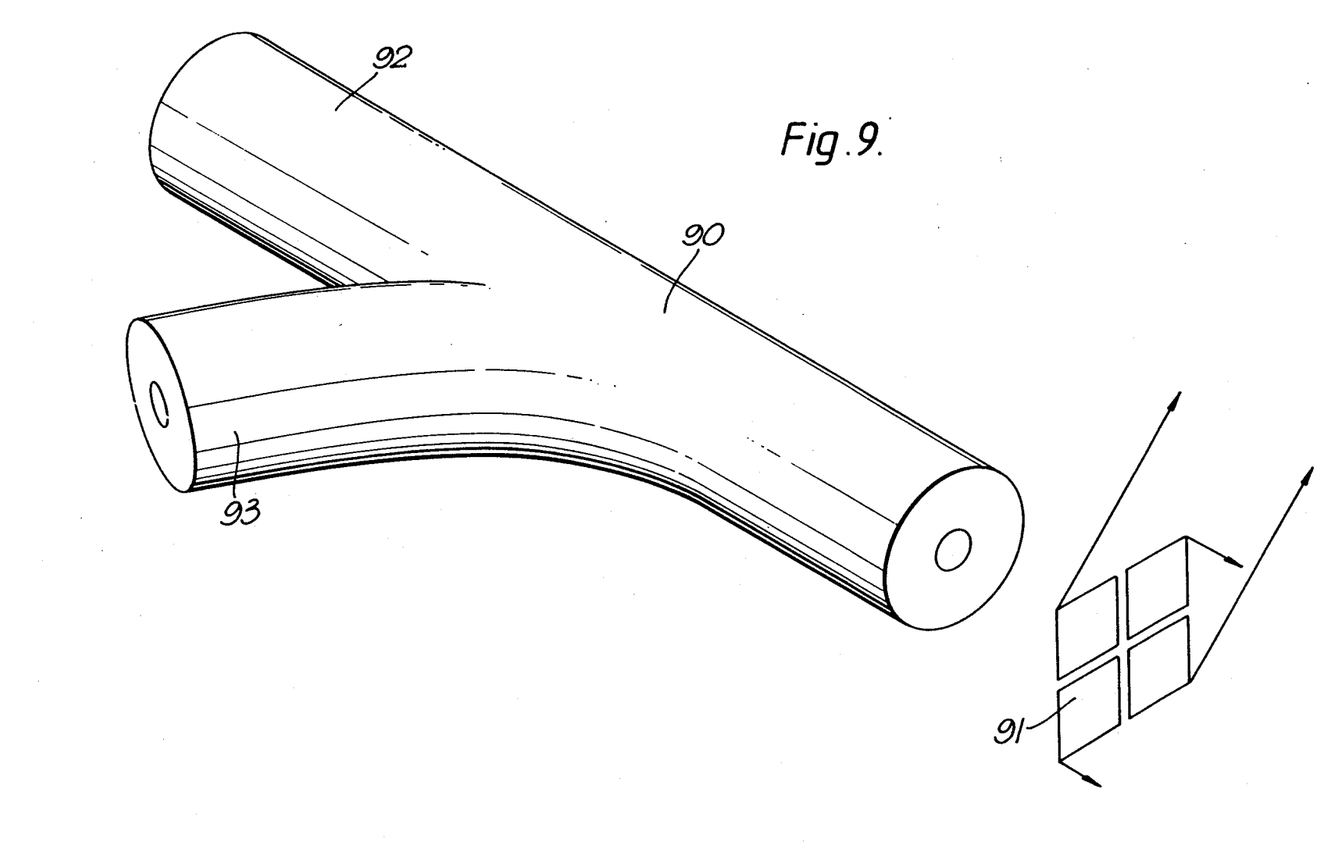
FIG. 9 is a schematic perspective view of an arrangement of optical mixer element and multisegment photodetector in which the invention is embodied in a preferred form.

Referring now to FIG. 9, an optical coherent detection system with phase diversity embodying the present invention in a preferred form consists essentially of an optical fibre mixing element constituted by coupler 90 and a multi-element, preferably a multisegment, photodetector 91. The coupler is provided with two input ports 92 and 93. One signal is launched into port 92 to propagate through the coupler 90 to reach the photodetector as a zero order field with a particular polarisation. The other signal is correspondingly launched into port 93 to reach the photodetector as a first order field with the same polarisation as that of the first-mentioned signal.

A feature of this configuration is that the alignment of the coupler 90 with respect to the photodetector 91 may be simply achieved by exciting only one of the inputs to the coupler so as to provide it with a circularly symmetric output, and adjusting for equal output from each of the segments of the photodetector.

Figure 10:
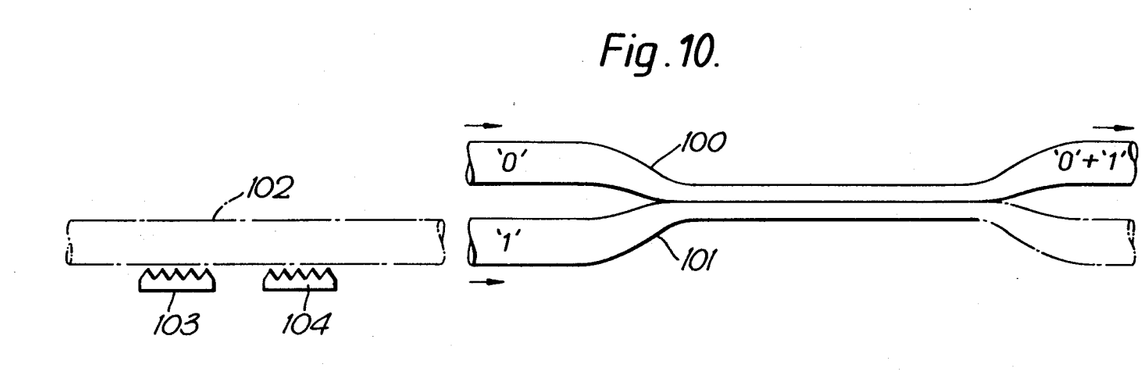
FIGS. 10 and 11 are diagrams of alternative forms of directional coupler for use as the optical mixer element of FIG. 9.

In FIG. 9 the coupler 90 has been represented as a three-port device because only three ports are required. In practice a convenient way of implementing the required coupler is in the form of a fused fibre tapered directional coupler which has been constructed from two fibres and has four ports. In this case both input ports are used, but only one of the output ports. Typically the unused output port is terminated with an attenuator pad to prevent problems from reflections. Such a coupler may be constructed from a pair of identical fibres. FIG. 10 schematically illustrates such a coupler constructed from identical fibres 100 and 101. The signal providing the requisite zero order field at the detector is launched into fibre 100 while that providing the requisite first order field is launched into fibre 101. The coupler may be of the kind in which the tapering is only just sufficient to produce total coupling of the first order field from fibre 101 to fibre 100 while leaving the more tightly bound zero order modes substantially uncoupled. Under these circumstances the requisite output is provided at the far end of fibre 100, while the far end of fibre 101 is unused and hence is shown in the drawing in broken outline. Alternatively, the tapering can be stronger and adjusted to provide that the zero order field couples from one fibre to the other n times while the first order couples (n+1) times. If n is an odd integer the rôles of the output ends of the two fibres are of course reversed. A convenient way of providing the requisite first order field at the input end of fibre 101 is to precede this point with a length 102 of fibre into which a zero order field is launched which is mode converted in that length, for instance by periodic deformation introduced by pressing the fibre against mechanical gratings. Typically two gratings 103, 104 are employed spaced apart the requisite distance to give the appropriate phase relations at the detector between the respective components of the first order field. Adjustment of phase may alternatively be achieved by local deformations induced by fibre loops (not shown). Such use of loops will also normally be the most convenient way of providing the requisite adjustment of phase for the zero order power launched into fibre 100. Relative phase adjustment of the components of the first order field may alternatively or additionally be made by cutting back the output arm of the coupler in order to make use of the dispersion it provides to these components.

The coupler of FIG. 10 is required to be capable of transmitting first order modes and hence it would superficially appear that it should not be constructed of single mode fibre. In practice however, it is frequently found that nominally single mode fibre is also capable of supporting first order modes, though with a greater attenuation than that afforded to the $HE_{11}$ modes, this greater value being such that it effectively extinguishes the first order modes in a distance of no more than a few tens of metres. Such fibre is therefore in fact suitable for use in the construction of the coupler provided that the distance between the input and output ports from the coupling region of the coupler is kept reasonably short. Alternatively, it may be constructed from fibre that has been specifically prepared as overmoded "single mode" fibre by choice of single mode fibre designed for a longer operating wavelength or by not drawing it down from preform to quite the extent required to achieve single mode operation.

Figure 11:
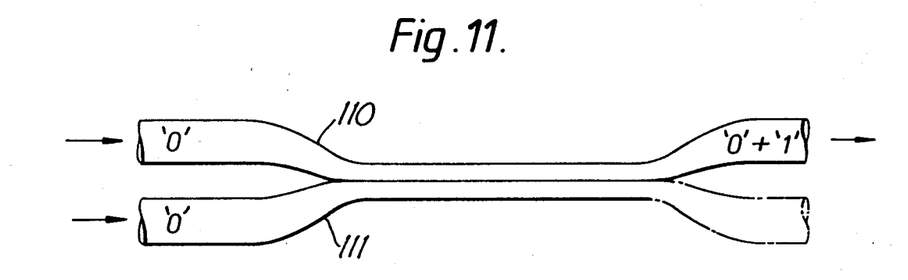

The 4-port coupler of FIG. 11 is distinguished from that of FIG. 10 in that two fibres 110 and 111 from which it is constructed are not identical, but are chosen so that in the coupling region the phase velocity of the zero order field propagating in fibre 111 is matched with that of the first order field propagating in fibre 110. This may be achieved with fibres of the same core size and the same core/cladding refractive index difference if the refractive index of the core of fibre 110 is an appropriate amount greater than that of fibre 111. Alternatively, this may be achieved with fibres with matching core refractive indices and matching cladding refractive indices if the core diameter of fibre 111 is made an appropriate smaller than that of fibre 110. The match in phase velocity means that optical power propagating in the zero order field in fibre 111 is coupled into optical power propagating in a first order field in fibre 110 by virtue of the overlapping of these fields in the coupling region. Optical power in zero order fields is therefore launched into the input ends of both fibres 110 and 111 to provide an output from fibre 110 consisting of a mixture of zero order field derived from its own input and first order field derived from the zero order input to the other fibre. As with the coupler of FIG. 10, the appropriate phase relationships to produce the requisite similar polarisations can be provided by the adjustment of the deformations introduced by the presence of fibre loops (not shown) on the input side of the coupling region Similarly, relative phase adjustment of the components of the first order field may alternatively or additionally be made by cutting back the output arm of the coupler in order to make use of the dispersion it provides to these components.

The mixing of the zero order and first order identically polarised fields at the multisegment detector is designed to produce an intensity distribution for which any change in phase of one of the fields with respect to that of the other produces solely a change in orientation of that intensity distribution. Attention is now directed to how a multisegment photodetector may be used to provide electrical signals for processing to produce a phase independent electrical signal output.

In principle the multisegment photodetector could have any number of segments, for instance it could be a six-sector array whose outputs can be processed in diametrically opposed pairs to produce output signals separated in phase by 120°. However, the preferred format of array is a quadrant photodetector because this shares the optical power between fewer receivers, each of which generates its own noise, and because the four outputs of a quadrant detector can be processed in diametrically opposed pairs to produce in-phase and phase quadrature outputs respectively. Such signals of the form $A \cos \theta$ and $A \sin \theta$ can be squared and summed to provide a final output signal that is independent of phase angle $\theta$. Each quadrant of the photodetector may be connected to its own low noise amplifier; however, it is generally preferred to connect the quadrants in diagonal pairs to two differential amplifiers as this provides a reduction in overall amplifier noise and hence an increased sensitivity provided that the effective responsivities can be accurately matched. Such matching is readily obtainable by exciting only one of the inputs to the coupler in order to produce a circularly symmetric intensity distribution across the surface of the photodetector and adjusting its position until all four quadrants produce identical photocurrents.

A different processing algorithm may be employed alternatively or additionally to the above described one for producing a phase invariant signal, for instance one to produce a signal which characterises changes in relative phase. Such an algorithm is described for instance in the previously referenced Stowe and Hsu paper. In this the difference signals produced from the two diagonally opposed pairs of quadrants are each multiplied with the derivative with respect to time of the other difference signal, and then one of these resulting signals is subtracted from the other.

FIG. 9 has shown the light as being detected upon the segments of a quadrant photodetector and hence it is at the surface of these segments that the phase of the components of each field have to be related in the way necessary to provide that field with the requisite polarisation. For some applications the elements of the detector may not be the segments of a multisegment photodetector but may be spaced apart in a different configuration which may involve such greater separation between the elements. In such circumstances the light will be guided separately to each element. It should be appreciated that any dispersion effects in these separate guides to the individual detector elements is of no consequence and that as a result it is the input ends of these separate guides which are to be considered as constituting the inputs to the multi-element photodetector, namely the inputs at which the polarisation of the first order field is required to be the same as that of the zero order field.

The foregoing description relating specifically to FIG. 9 has been in the context of employing the elements of that Figure in an optical coherent detection system with phase diversity, but by changing the modes applied to its input ports 92 and 93, the coherent detection system may be converted into one with polarisation diversity. This results for instance when a zero order $HE_{11}$ mode input is applied to one input port and, in phase with this $HE_{11}$ mode input, a first order $TM_{01}$ or $TE_{01}$ mode is applied to the other input port. Referring to FIGS. 1a, 1b, 2a and 2b, if the $HE_{11}$ mode has its polarisation plane oriented as depicted in FIG. 1a, when it is mixed with the $TE_{01}$ mode of FIG. 3, the asymmetric resultant intensity distribution is stronger at the left hand side where the fields are reinforcing than at the right hand side where they are in opposition. Rotation of the polarisation plane of the $HE_{11}$ mode is seen merely to result in a rotation of the resultant intensity distribution without otherwise changing its shape. A similar situation applies if, instead of mixing the $HE_{11}$ mode with the $TE_{01}$, the $HE_{11}$ mode is mixed with the $TM_{01}$ mode. In a heterodyne system the relative phase of the signals applied to the two input ports is continually changing, and so the asymmetric intensity distribution is amplitude modulated at the beat frequency. From this it also follows that in a heterodyne system the application of two orthogonal linearly polarised $HE_{11}$ mode signals in phase quadrature to the first input port will produce two asymmetric intensity distributions that are amplitude modulated in phase quadrature at the beat frequency. In other words the system is responsive to any polarisation state of $HE_{11}$ modes input, and is capable of distinguishing between such states.

If the requisite first order mode $TE_{01}$ or $TM_{01}$ for a polarisation sensitive coherent detection system is generated by induced mode coupling from an $HE_{11}$ mode it may not always be convenient to arrange for only one of these two first order modes to be excited to the exclusion of the other. In fact this is not a problem provided that they are in phase with each other at the point where these modes are coherently mixed with the other $HE_{11}$ mode. The situation is therefore somewhat analogous that of phase diversity system but, whereas in the phase diversity system phase quadrature is required and can be obtained by cutting back the fibre to the appropriate length, in the polarisation diversity system such cutting back will be to a point where the two first order mode signals are in phase with each other. Referring again to FIGS. 2a and 2b, it is seen that the polarisation direction at points around the annulus of the combined first order $TE_{01}$ and $TM_{01}$ modes is neither exactly radial nor exactly tangential, but lies somewhere in between.

The coherent detection system with polarisation diversity does not have phase diversity and hence, as mentioned before, there is of course no interference effect whenever the two interfering signals are in phase quadrature. This means that in a heterodyne detection system the asymmetric pattern generated by the interference effect is amplitude modulated at the beat frequency. In a homodyne detection system it means that other steps have to be taken to avoid a permanent phase quadrature condition persisting.

Algorithms for processing the electrical signal outputs of the four quadrants of the photodetector in this polarisation diversity system may correspond with those employable in the phase diversity system. Thus for instance algorithms that in the phase diversity system produce outputs that are independent of phase and that are representative of the rate of change of phase, in this polarisation diversity system produce outputs that respectively are independent of the state of polarisation of the zero order mode optical signal and representative of the rate of change of its state of polarisation.

We claim:

1. An optical system including a multi-element photodetector and an optical mixing element for coherently mixing first and second optical input signals for detection at a photodetector, wherein the mixing element includes means to mix said first and second input signals for incidence upon the photodetector respectively in the form providing a zero order optical field distribution and in the form of a first order field distribution, which mixing element is constituted of an optical fiber directional coupler constructed from two optical fibre means to provide said coupler with first and second input ports and a first output port, and to provide said coupler with a coupling configuration that produces a coupling coefficient for zero order modes different from that for first order modes by an amount such that zero order mode light launched into said first input port emerges from the coupler substantially entirely from said first output port and first order mode light launched into said second input port emerges from the coupler substantially entirely from said first output port.

2. An optical system as claimed in claim 1, wherein the second input port of said directional coupler is provided with a mode mixing element which induces coupling between zero order modes and first order modes launched into this port.

3. An optical system as claimed in claim 1, wherein said optical fibre means comprises two fibres which are non-identical and have different propagation constants having the property that in the coupler the propagation constants of the zero order modes one of said two fibres are substantially mated with the propagation constants of the first order modes of the other of said two fibres.

4. An optical system as claimed in claim 1, wherein said multi-element photodetector is a quadrant photodetector.

5. A method of optical signals processing comprising coherently mixing first and second optical signals of different mode order to produce a spatial intensity distribution that is not circularly symmetric, wherein the modes of the two signals are related to each other in such a way that they exhibit the property that a change in relative phase of the two signals produces a charge in the orientation of said non-circularly-symmetric spatial intensity distribution.

6. A method as claimed in claim 5, wherein the first and second optical signals are coherently mixed for detection at a multi-element detector respectively in the form of a zero field distribution and in the form of a first order field distribution.

7. A method of optical signals processing comprising coherently mixing first and second optical signals for detection at a multi-element photodetector respectively in the form of a substantially circularly polarised zero order field distribution and in the form of a substantially circularly polarised first order field distribution, wherein said field distributions are substantially circularly polarised in the same rotational sense.

8. A method as claimed in claim 7, wherein the outputs of the elements of the photodetector are processed to provide an electrical signal that is independent of the relative phase of the first and second optical signals.

9. A method as claimed in claim 7, wherein the outputs of the elements of the photodetector are processed to provide an electrical signal that is representative of the change of phase of the first optical signal with respect to the second.

10. A method of optical signals processing comprising coherently mixing first and second optical signals for detection at a multi-element photodetector respectively in the form of a substantially linearly polarised zero order field distribution and in the form of a substantially linearly polarised first order field distribution, wherein said field distributions are substantially linearly polarised in substantially the same direction.

11. A method as claimed in claim 10, wherein the outputs of the elements of the photodetector are processed to provide an electrical signal that is independent of the relative phase of the first and second optical signals.

12. A method as claimed in claim 10, wherein the outputs of the elements of the photodetector are processed to provide an electrical signal that is representative of the change of phase of the first optical signal with respect to the second.

13. A method of optical signals processing comprising coherently mixing first and second optical signals of different mode order to produce a spatial intensity distribution that is not circularly symmetric, wherein the modes of the two signals are related to each other in such a way that they exhibit the property that a change in relative polarisation state of the two signals produces a change in the orientation of said non-circularly-symmetric spatial intensity distribution.

14. A method as claimed in claim 13, wherein the first and second optical signals are coherently mixed for detection at a multi-element detector respectively in the form of a zero order field distribution and in the form of a first order field distribution.

15. A method of optical signals processing comprising coherently mixing first and second optical signals for detection at a multi-element photodetector respectively in the form of a zero order field distribution and in the form of a first order field distribution, wherein the zero order field distribution is selected from the group comprising the field distribution of a substantially linearly polarised zero order $HE_{11}$ mode and that of a substantially phase quadrature mixture of two substantially orthogonally polarised zero order $HE_{11}$ modes, and wherein the first order field distribution is selected from the group comprising the field distribution of a $TE_{01}$ mode, that of a $TM_{01}$ mode, and that of a substantially inphase mixture of $TE_{01}$ and $TM_{01}$ modes.

16. A method as claimed in claim 15, wherein the outputs of the elements of the photodetector are processed to provide an electrical signal that is independent of the relative states of polarisation of the first and second optical signals.

17. A method as claimed in claim 15, wherein the outputs of the elements of the photodetector are processed to provide an electrical signal that is representative of the change of the relative states of polarisation of the first and second optical signals.

* * * * *